(12) United States Patent
Fisher-Jeffes et al.

(10) Patent No.: US 11,399,390 B2
(45) Date of Patent: Jul. 26, 2022

(54) FLOATING FRAME-BASED CHANNEL OCCUPANCY TIME IN FIXED FRAME PERIOD IN MOBILE COMMUNICATIONS

(71) Applicant: MediaTek Singapore Pte. Ltd., Singapore (SG)

(72) Inventors: Timothy Perrin Fisher-Jeffes, San Jose, CA (US); Jiann-Ching Guey, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 181 days.

(21) Appl. No.: 16/836,918

(22) Filed: Apr. 1, 2020

(65) Prior Publication Data
US 2020/0322988 A1    Oct. 8, 2020

Related U.S. Application Data

(60) Provisional application No. 62/827,918, filed on Apr. 2, 2019.

(51) Int. Cl.
| | | |
|---|---|---|
| *H04L 12/28* | (2006.01) | |
| *H04W 74/08* | (2009.01) | |
| *H04W 72/04* | (2009.01) | |
| *H04W 16/14* | (2009.01) | |
| *H04J 1/16* | (2006.01) | |

(52) U.S. Cl.
CPC ....... *H04W 74/0808* (2013.01); *H04W 16/14* (2013.01); *H04W 72/0446* (2013.01); *H04W 72/0453* (2013.01)

(58) Field of Classification Search
CPC ............. H04W 16/14; H04W 72/0446; H04W 72/0453; H04W 74/0808; H04W 74/0816
USPC .................................. 370/252, 329, 430, 445
See application file for complete search history.

(56) References Cited

U.S. PATENT DOCUMENTS

| | | | | |
|---|---|---|---|---|
| 2017/0318607 | A1* | 11/2017 | Tiirola | H04L 27/0006 |
| 2020/0314891 | A1* | 10/2020 | Li | H04W 16/14 |
| 2021/0176783 | A1* | 6/2021 | Xue | H04W 16/14 |
| 2021/0298072 | A1* | 9/2021 | Oh | H04W 74/006 |

FOREIGN PATENT DOCUMENTS

| | | |
|---|---|---|
| WO | WO 2016182387 A1 | 11/2016 |
| WO | WO 2017219284 A1 | 12/2017 |

OTHER PUBLICATIONS

China National Intellectual Property Administration, International Search Report and Written Opinion for PCT/CN2020/082681, dated Jul. 2, 2020.
Huawei et al., DL channels and signals in NR unlicensed band, 3GPP TSG RAN WG1 Meeting #96, R1-1901523, Mar. 1, 2019.

(Continued)

*Primary Examiner* — John Pezzlo
(74) *Attorney, Agent, or Firm* — Han IP PLLC; Andy M. Han (57) ABSTRACT

Examples pertaining to a floating frame-based channel occupancy time (COT) in a fixed frame period (FFP) in mobile communications are described. An apparatus implemented in FBE performs clear channel assessment (CCA) of a channel. The apparatus then transmits during a COT within a FFP in response to the CCA indicating the channel to be clear for transmission.

16 Claims, 5 Drawing Sheets

(56) References Cited

OTHER PUBLICATIONS

Oualcomm Incorporated, TP proposed for 38.889, 3GPP TSG RAN WG1 #95, R1-1814192, Nov. 16, 2018.
Huawei et al., Coexistence and channel access for NR unlicensed band operations, 3GPP TSG RAN WG1 Ad-Hoc Meeting 1901, R1-1900060, Jan. 25, 2019.

* cited by examiner

```
┌─────────────────────────────────────────┐
│  DETERMINE, BY A PROCESSOR OF AN APPARATUS │
│  IMPLEMENTED IN A FRAME-BASED EQUIPMENT (FBE), A │
│  SELECTED NUMBER OF OBSERVATION SLOTS FOR CLEAR │
│  CHANNEL ASSESSMENT (CCA) BEFORE A CHANNEL │
│  OCCUPANCY TIME (COT) WITHIN A FIXED FRAME PERIOD │
│  (FFP)                                  │
│  510                                    │
└─────────────────────────────────────────┘
                    │
                    ▼
┌─────────────────────────────────────────┐
│  PERFORM, BY THE PROCESSOR, THE CCA OF THE CHANNEL │
│  DURING THE DETERMINED NUMBER OF OBSERVATION SLOTS │
│  520                                    │
└─────────────────────────────────────────┘
                    │
                    ▼
┌─────────────────────────────────────────┐
│  TRANSMIT, BY THE PROCESSOR, DURING THE COT │
│  RESPONSIVE TO THE CCA INDICATING THE CHANNEL TO BE │
│  CLEAR FOR TRANSMISSION                 │
│  530                                    │
└─────────────────────────────────────────┘
```

FIG. 5

FLOATING FRAME-BASED CHANNEL OCCUPANCY TIME IN FIXED FRAME PERIOD IN MOBILE COMMUNICATIONS

CROSS REFERENCE TO RELATED PATENT APPLICATION(S)

The present disclosure is part of a non-provisional application claiming the priority benefit of U.S. Patent Application No. 62/827,918, filed on Apr. 2, 2019, the content of which being incorporated by reference in its entirety.

TECHNICAL FIELD

The present disclosure is generally related to mobile communications and, more particularly, to techniques pertaining to a floating frame-based channel occupancy time in a fixed frame period in mobile communications.

BACKGROUND

Unless otherwise indicated herein, approaches described in this section are not prior art to the claims listed below and are not admitted as prior art by inclusion in this section.

Currently, an European Telecommunications Standards Institute (ETSI)-compliant frame-based equipment (FBE) cannot coexist with another ETSI-compliant FBE on the same shared unlicensed spectrum frequency band, and the FBE with the lower fixed frame period (FFP) would dominate. That is, in case both FBEs have the same FFP, one of them would completely dominate or the transmissions from both would completely collide. There is presently no prioritization mechanism to address this issue and, hence, there is a need for a solution.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, techniques, methods and apparatuses to address the aforementioned issue. For instance, it is believed that some proposed schemes in accordance with the present disclosure would allow coordination between FBE devices sharing the same unlicensed frequency band. Moreover, it is believed that some proposed schemes in accordance with the present disclosure would allow the channel occupancy time (COT) of an FBE device to float within its respective FFP. Accordingly, various proposed schemes in accordance with the present disclosure would allow fair sharing of shared unlicensed spectrum amongst FBE devices and coordination would not be required for floating COT within a FFP.

In one aspect, a method may involve a processor of an apparatus, implemented in a FBE, performing clear channel assessment (CCA) of a channel. Additionally, the method may involve the processor transmitting during a COT within a FFP responsive to the CCA indicating the channel to be clear for transmission.

In another aspect, a method may involve a processor of an apparatus, implemented in a FBE, determining a selected number of observation slots for CCA before a COT within a FFP. The method also involve the processor performing the CCA of the channel during the determined number of observation slots. The method may further involve the processor transmitting during the COT responsive to the CCA indicating the channel to be clear for transmission.

In yet another aspect, an apparatus implemented in a FBE may include a transceiver and a processor coupled to the transceiver. The transceiver may be configured to communicate with at least a network node. The processor may be configured to perform, via the transceiver, CCA of a channel. The processor may be also configured to transmit, via the transceiver, during a COT within a FFP responsive to the CCA indicating the channel to be clear for transmission.

It is noteworthy that, although description provided herein may be in the context of certain radio access technologies, networks and network topologies such as 5th Generation (5G)/New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial Internet-of-Things (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a floating frame-based COT in a FFP in mobile communications. According to the present disclosure, a number of possible solutions may be implemented separately or jointly. That is, although these possible solutions may be described below separately, two or more of these possible solutions may be implemented in one combination or another.

Figure 1:
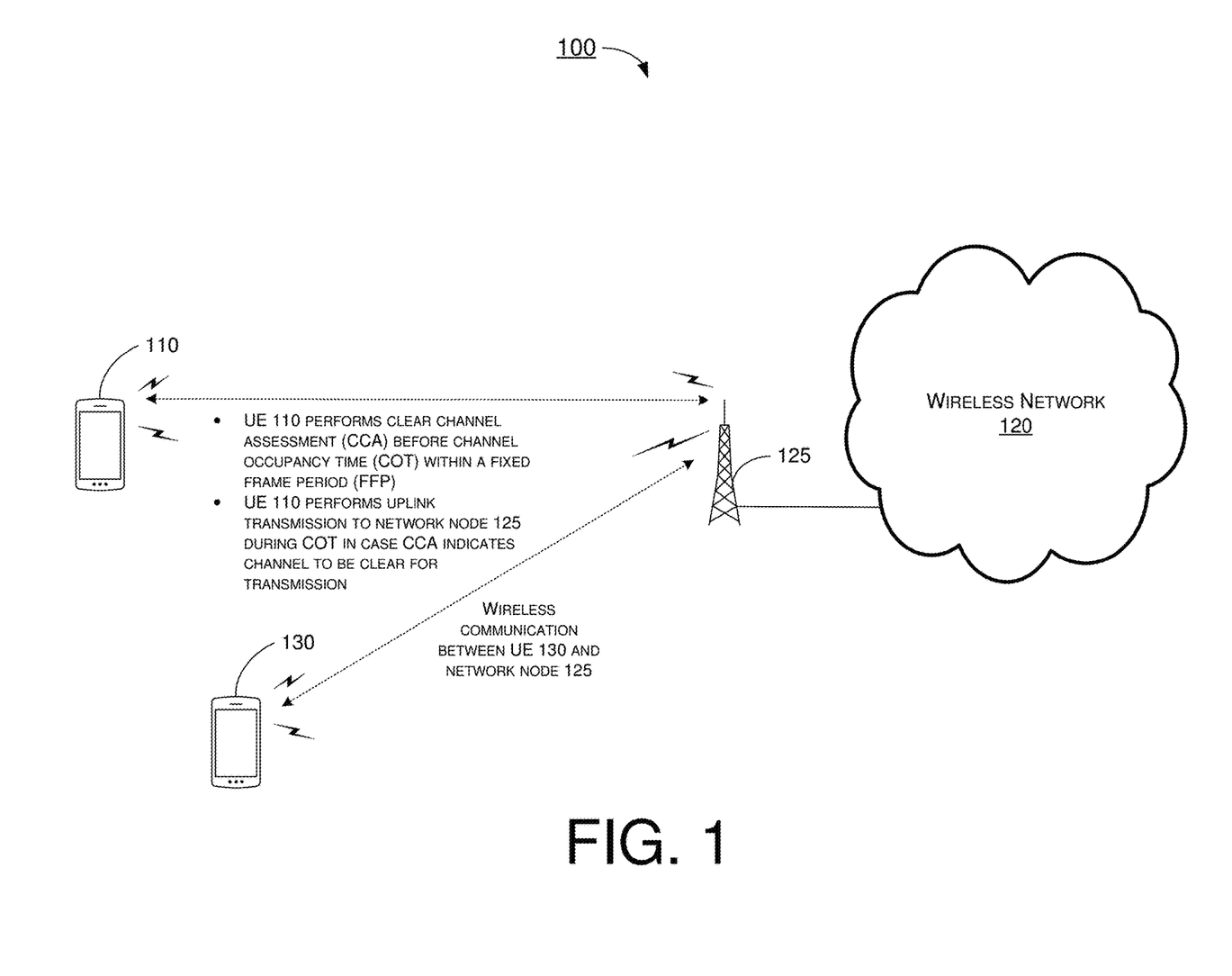
FIG. 1 is a diagram of an example network environment in which various solutions and schemes in accordance with the present disclosure may be implemented.
Figure 2:
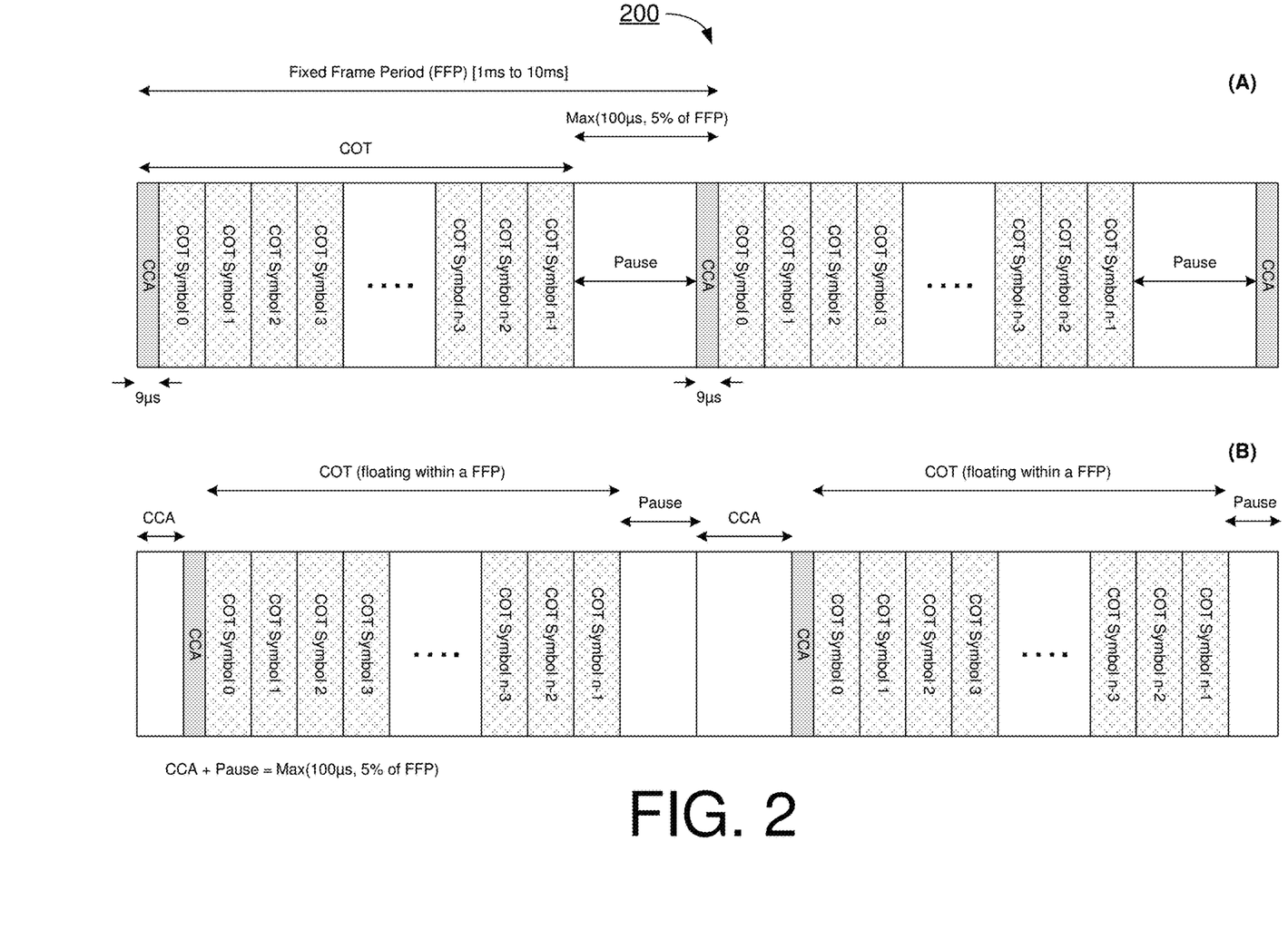
FIG. 2 shows an example scenario in accordance with an implementation of the present disclosure.

FIG. 1 illustrates an example network environment 100 in which various solutions and schemes in accordance with the present disclosure may be implemented. FIG. 2 illustrates example scenario 200 in accordance with an implementation of the present disclosure. Scenario 200 may be implemented in network environment 100. The following description of various proposed schemes is provided with reference to FIG. 1 and FIG. 2.

Referring to FIG. 1, network environment 100 may involve a UE 110 and at least another UE 130 in wireless communication with a wireless network 120 (e.g., a 5G NR mobile network). Either or both of UE 110 and UE 130 may be in wireless communication with wireless network 120 via a base station or network node 125 (e.g., an eNB, gNB or transmit-receive point (TRP)). Each of UE 110 and UE 130 may be a FBE. In network environment 100, UE 110, UE 130 and wireless network 120 may implement various schemes pertaining to a floating frame-based COT in a FFP in mobile communications in accordance with the present disclosure, as described herein.

Referring to FIG. 2, part (A) shows a currently defined ETSI FBE adaptivity and part (B) shows an example floating FBE adaptivity under a proposed scheme in accordance with the present disclosure. Adaptivity is meant to be defined in such a way to allow multiple devices to fairly participate in shared spectrum access. ETSI FBE adaptivity allows a single FBE to somewhat fairly share access with other load-based equipment (LBE) but not with any other FBE. For example, among two or more FBEs, the FBE with the shorter/shortest FFP would almost always (e.g. 95% of the time) dominate over the other FBE(s). Thus, FBEs sharing a common FFP would consistently collide in case their FFPs are aligned; otherwise, one FBE with earlier phase would always (e.g., 100% of the time) dominate over other FBE(s). Clearly, there is a need for a FBE adaptivity rule that enables FBEs to share a channel with other FBEs.

Under a proposed scheme in accordance with the present disclosure, frame-based COT floating in a FFP may be allowed or otherwise enabled. In particular, under the proposed scheme, any COT may be prepended with a random number of CCA slots of duration n μs where the channel is sensed to be free (or not). For instance, n μs may be 9 μs to align with 9 μs LBE and current FBE slots or it may be different in duration (e.g., longer or shorter than 9 μs). Moreover, under the proposed scheme, the CCA period may be different than (e.g., not exceeding) an enforced idle period of a FFP. For instance, the CCA period may be equal to or less than a maximum idle period currently defined by ETSI as max(100 μs, 5% of the FFP)/n. Additionally, under the proposed scheme, a FBE (e.g., UE 110) may perform transmission after an observation slot period is sensed free (e.g., clear for transmission). The observation slot period may selected randomly, selected in a round-robin manner, or assigned by a supervising device (e.g., UE 130, another UE (not shown), or network node 125). Accordingly, the proposed scheme effectively 'floats' the COT period within the FFP, while still maintaining a regular FFP, as shown in part (B) of FIG. 2. Put differently, the proposed scheme inserts a random phase in the FFP. Therefore, the proposed scheme would allow one FBE (e.g., UE 110) to coexist with one or more other FBEs (e.g., UE 130). Advantageously, adaptivity procedure may become simpler, lower power may be required for performing CCA, and access to shared spectrum may be predictable through regular FFP. For instance, advanced receiver architecture, such as coordinated multi-point (CoMP), may be allowed.

Under a proposed scheme in accordance with the present disclosure, to achieve frame-based COT floating in a FFP, a FBE (e.g., UE 110) may select a random number in a range of [0, CW], where CW (denoting "contention window") may or may not be greater than max(100 μs, 5% of the COT)/n (e.g., with n being 9 μs). Under the proposed scheme, CW may be fixed or adjustable based on measured congestion experienced on a channel in concern. Under the proposed scheme, a value of CW greater than max(100 μs, 5% of the COT) may imply that there is no access on a particular access attempt. It is believed that the proposed scheme would have no impact on other competing LBE's ability to gain channel access. On the other hand, it is believed that the proposed scheme would enable a FBE to prioritize access to a channel by either selecting from a reduced random set by reducing CW or selecting multiple observation slots in which possible transmission may occur. The multiple observation slots may be selected randomly, selected in a round-robin manner, or assigned by a supervising device (e.g., UE 130, another UE (not shown), or network node 125).

For instance, the FBE (e.g., UE 110) may divide a pause period into multiple CW observation slots (e.g., 9 μs in a 5 GHz band), and CW may be limited to a maximum value CW_max. The FBE may then select a random number q in the range of [0, CW] and sense a carrier using CCA after q observation slots, and access may be granted if available. Under the proposed scheme, the value of q may continue to count down in subsequent observation slots in case access has not been granted or a new random number may be drawn. Moreover, under the proposed scheme, priority for transmission may be based on FFP and CW_max.

In view of the above, it is believed that one of ordinary skill in the art would appreciate that the proposed schemes allow coordination between FBEs sharing the same unlicensed frequency band (e.g., by using some fair sharing mechanism such as a round-robin scheme). It is also believed that one of ordinary skill in the art would appreciate that the proposed schemes allow a FBE's COT to float within its FFP. In contrast, currently, unlike LBEs, FBEs have no prioritization mechanism. Currently FBEs also have no priority classes.

Illustrative Implementations

Figure 3:
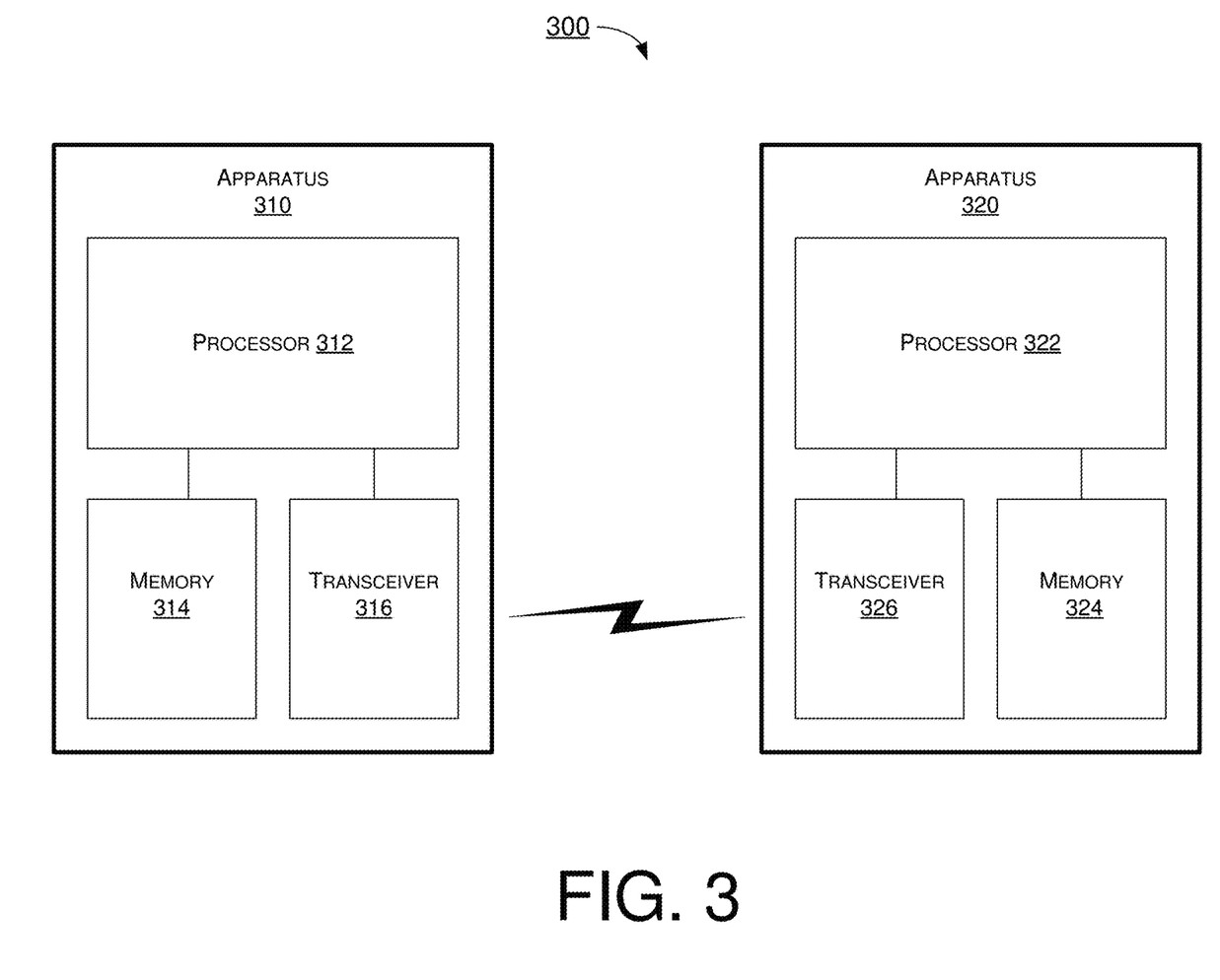
FIG. 3 is a block diagram of an example communication system in accordance with an implementation of the present disclosure.

FIG. 3 illustrates an example communication system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to a floating frame-based COT in a FFP in mobile communications, including the various schemes described above with respect to various proposed designs, concepts, schemes, systems and methods described above, including network environment 100, as well as processes described below.

Each of apparatus 310 and apparatus 320 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 310 and apparatus 320 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in an LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC or RISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to a floating frame-based COT in a FFP in mobile communications in accordance with various implementations of the present disclosure.

In some implementations, apparatus 310 may also include a transceiver 316 coupled to processor 312. Transceiver 316 may be capable of wirelessly transmitting and receiving data. In some implementations, transceiver 316 may be capable of wirelessly communicating with different types of wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for multiple-input multiple-output (MIMO) wireless communications. In some implementations, apparatus 320 may also include a transceiver 326 coupled to processor 322. Transceiver 326 may include a transceiver capable of wirelessly transmitting and receiving data. In some implementations, transceiver 326 may be capable of wirelessly communicating with different types of UEs/wireless networks of different RATs. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (FeRAM), magnetoresistive RAM (MRAM) and/or phase-change memory.

Each of apparatus 310 and apparatus 320 may be a communication entity capable of communicating with each other using various proposed schemes in accordance with the present disclosure. For illustrative purposes and without limitation, a description of capabilities of apparatus 310, as a UE (e.g., UE 110), and apparatus 320, as a network node (e.g., network node 125) of a wireless network (e.g., wireless network 120 as a 5G/NR mobile network), is provided below.

In one aspect of a floating frame-based COT in a FFP in mobile communications in accordance with the present disclosure, processor 312 of apparatus 310, implemented in a FBE (e.g., UE 110), may perform, via transceiver 316, CCA of a channel of wireless communication between UE 110 and network node 125 of wireless network 120. Moreover, processor 312 may transmit, via transceiver 316, to network node 125 during a COT within a FFP in response to the CCA indicating the channel to be clear for transmission.

In some implementations, in performing the CCA of the channel, processor 312 may perform the CCA of the channel before the COT and within the FFP.

In some implementations, in performing the CCA of the channel, processor 312 may perform certain operations. For instance, processor 312 may prepend the COT with one or more observation slots. Additionally, processor 312 may sense the channel using the CCA during the one or more observation slots. In such cases, a duration of the one or more observation slots may be different than (e.g., less than or equal to) an idle period of the FFP. In some implementations, a number of observation slots of the one or more observation slots may be selected so that the one or more observation slots align with a predefined number of LBE slots.

Alternatively, in performing the CCA of the channel, processor 312 may perform other operations. For instance, processor 312 may divide a pause period in the FFP into a first number of observation slots. Additionally, processor 312 may select a second number of the observation slots, with the second number different than (e.g., less than or equal to or, alternatively, greater than) the first number. Moreover, processor 312 may sense the channel using the CCA after the second number of observation slots and before the COT. In some implementations, the second number may be in a range of [0, contention window]. In such cases, the contention window may be different than (e.g., less than or equal to) a maximum idle period expressed as max(100 μs, 5% of the FFP)/n, and n may be 9 μs.

In some implementations, in performing the CCA of the channel, processor 312 may prioritize access to the channel. In prioritizing the access to the channel, processor 312 may perform certain operations. For instance, processor 312 may divide a pause period in the FFP into a plurality of observation slots. Moreover, processor 312 may select one or more observation slots from the plurality of observation slots by either: (a) selecting from a random subset of the plurality of observation slots; or (b) selecting multiple observation slots from the plurality of observation slots in which transmission is likely. Furthermore, processor 312 may sense the channel using the CCA during the selected one or more observation slots.

In some implementations, a duration of the CCA may not exceed an idle period of the FFP. In some implementations, the idle period of the FFP may be either a predefined period of time or a predefined percentage of the COT. In such cases, the predefined period of time may be 100 μs and the predefined percentage of the COT may be 5%.

In another aspect of a floating frame-based COT in a FFP in mobile communications in accordance with the present disclosure, processor 312 of apparatus 310, implemented in a FBE (e.g., UE 110), may determine a selected number of observation slots for CCA before a COT within a FFP. Additionally, processor 312 may perform, via transceiver 316, the CCA of the channel during the determined number of observation slots. Moreover, processor 312 may transmit, via transceiver 316, during the COT responsive to the CCA indicating the channel to be clear for transmission.

In some implementations, in determining the selected number of observation slots, processor 312 may perform one of a number of operations. For instance, processor 312 may randomly select the selected number of observation slots, with the selected number being in a range of [0, contention window]. Alternatively, processor 312 may select the selected number of observation slots in a round-robin manner. Still alternatively, processor 312 may receive an assignment of the selected number of observation slots from a supervising device (e.g., UE 130, another UE, or network node 125).

In some implementations, the contention window may be different than (e.g., less than or equal to) a maximum idle period expressed as max(100 μs, 5% of the FFP)/n. In such cases, n may be 9 μs.

Illustrative Processes

Figure 4:
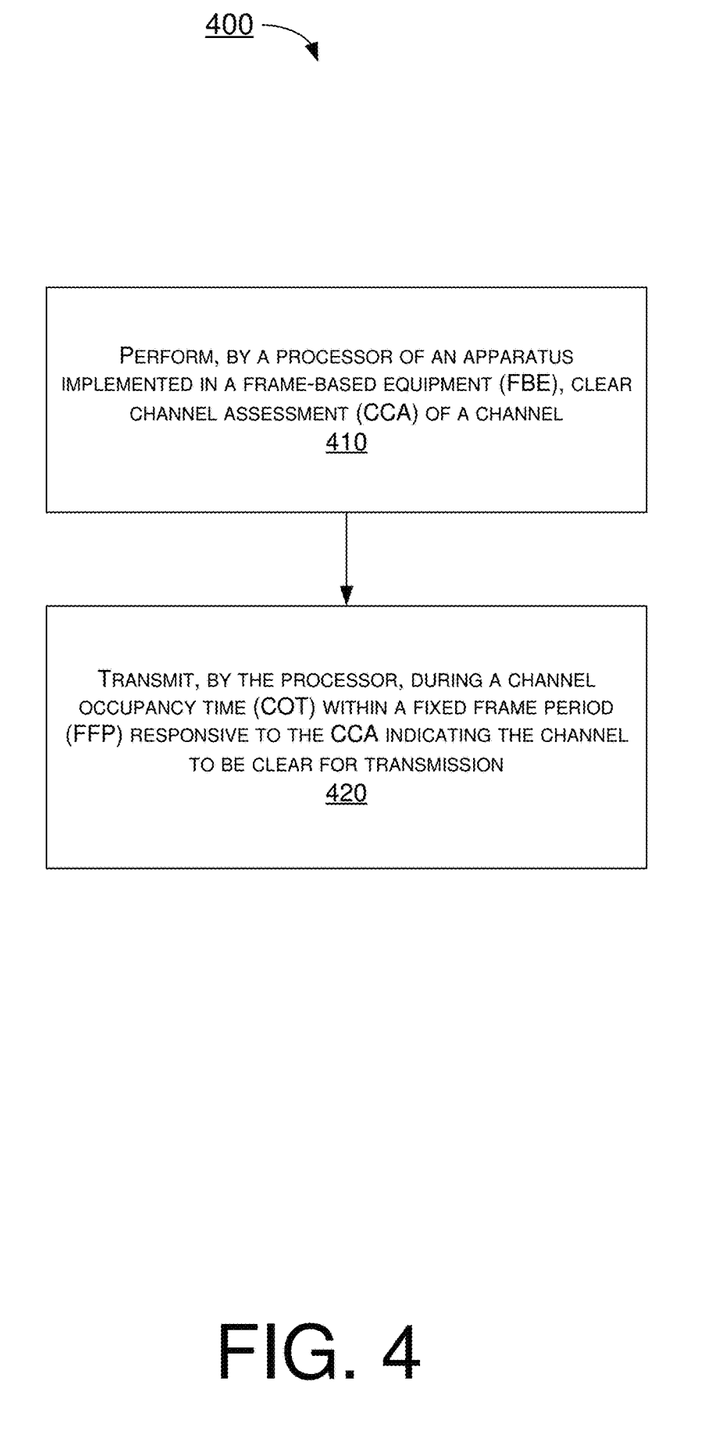
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to FIG. 1~FIG. 3. More specifically, process 400 may represent an aspect of the proposed concepts and schemes pertaining to a floating frame-based COT in a FFP in mobile communications. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 310 and apparatus 320 as well as any variations thereof. Solely for illustrative purposes and without limiting the scope, process 400 is described below in the context of apparatus 310 as a UE (e.g., UE 110) and apparatus 320 as a communication entity such as a network node or base station (e.g., network node 125) of a wireless network (e.g., wireless network 120). Process 400 may begin at block 410.

At 410, process 400 may involve processor 312 of apparatus 310, implemented in a FBE (e.g., UE 110), performing, via transceiver 316, CCA of a channel of wireless communication between UE 110 and network node 125 of wireless network 120. Process 400 may proceed from 410 to 420.

At 420, process 400 may involve processor 312 transmitting, via transceiver 316, to network node 125 during a COT within a FFP in response to the CCA indicating the channel to be clear for transmission.

In some implementations, in performing the CCA of the channel, process 400 may involve processor 312 performing the CCA of the channel before the COT and within the FFP.

In some implementations, in performing the CCA of the channel, process 400 may involve processor 312 performing certain operations. For instance, process 400 may involve processor 312 prepending the COT with one or more observation slots. Additionally, process 400 may involve processor 312 sensing the channel using the CCA during the one or more observation slots. In such cases, a duration of the one or more observation slots may be different than (e.g., less than or equal to) an idle period of the FFP. In some implementations, a number of observation slots of the one or more observation slots may be selected so that the one or more observation slots align with a predefined number of LBE slots.

Alternatively, in performing the CCA of the channel, process 400 may involve processor 312 performing other operations. For instance, process 400 may involve processor 312 dividing a pause period in the FFP into a first number of observation slots. Additionally, process 400 may involve processor 312 selecting a second number of the observation slots, with the second number different than (e.g., less than or equal to or, alternatively, greater than) the first number. Moreover, process 400 may involve processor 312 sensing the channel using the CCA after the second number of observation slots and before the COT. In some implementations, the second number may be in a range of [0, contention window]. In such cases, the contention window may be different than (e.g., less than or equal to) a maximum idle period expressed as max(100 µs, 5% of the FFP)/n, and n may be 9 µs.

In some implementations, in performing the CCA of the channel, process 400 may involve processor 312 prioritizing access to the channel. In prioritizing the access to the channel, process 400 may involve processor 312 performing certain operations. For instance, process 400 may involve processor 312 dividing a pause period in the FFP into a plurality of observation slots. Moreover, process 400 may involve processor 312 selecting one or more observation slots from the plurality of observation slots by either: (a) selecting from a random subset of the plurality of observation slots; or (b) selecting multiple observation slots from the plurality of observation slots in which transmission is likely. Furthermore, process 400 may involve processor 312 sensing the channel using the CCA during the selected one or more observation slots.

In some implementations, a duration of the CCA may not exceed an idle period of the FFP. In some implementations, the idle period of the FFP may be either a predefined period of time or a predefined percentage of the COT. In such cases, the predefined period of time may be 100 µs and the predefined percentage of the COT may be 5%.

Figure 5:
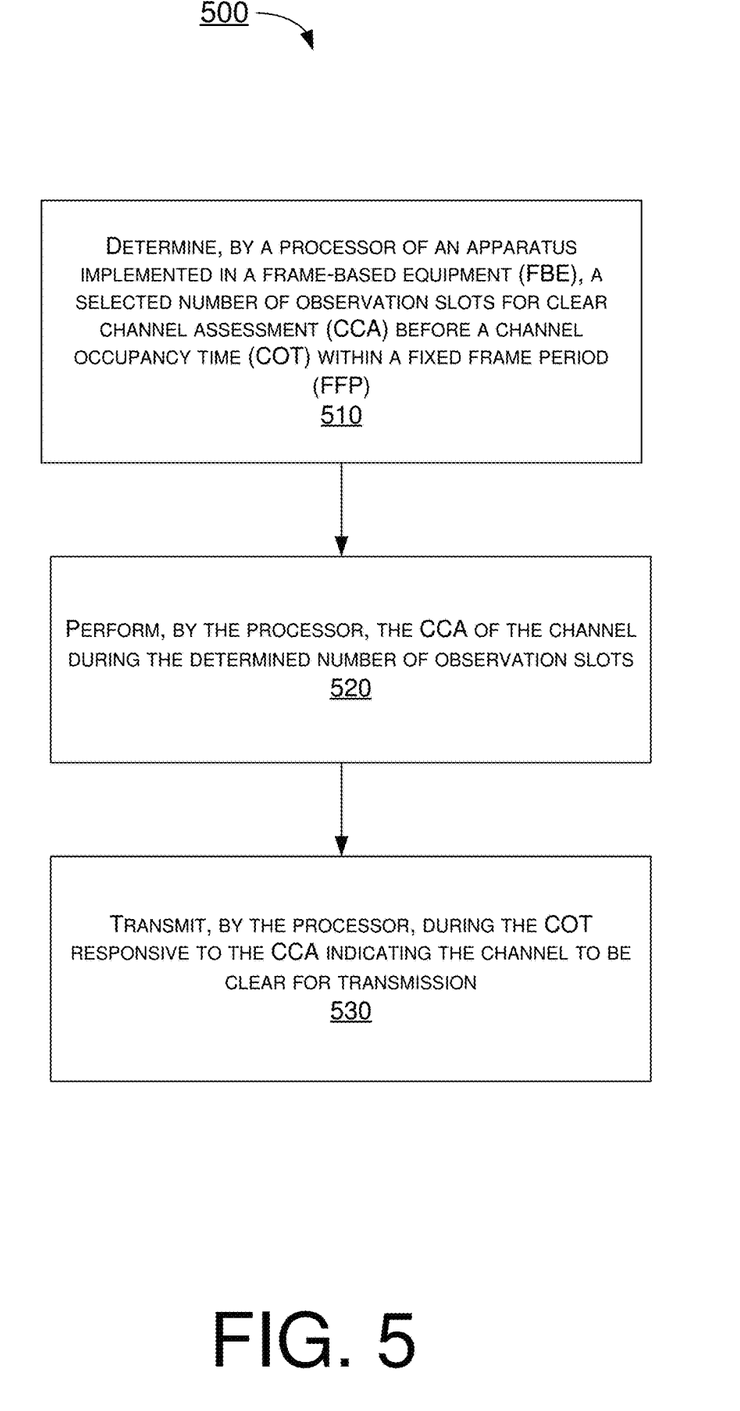
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1~FIG. 3. More specifically, process 500 may represent an aspect of the proposed concepts and schemes pertaining to a floating frame-based COT in a FFP in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 310 and apparatus 320 as well as any variations thereof. Solely for illustrative purposes and without limiting the scope, process 500 is described below in the context of apparatus 310 as a UE (e.g., UE 110) and apparatus 320 as a communication entity such as a network node or base station (e.g., network node 125) of a wireless network (e.g., wireless network 120). Process 500 may begin at block 510.

At 510, process 500 may involve processor 312 of apparatus 310, implemented in a FBE (e.g., UE 110), determining a selected number of observation slots for CCA before a COT within a FFP. Process 500 may proceed from 510 to 520.

At 520, process 500 may involve processor 312 performing, via transceiver 316, the CCA of the channel during the determined number of observation slots. Process 500 may proceed from 520 to 530.

At 530, process 500 may involve processor 312 transmitting, via transceiver 316, during the COT responsive to the CCA indicating the channel to be clear for transmission.

In some implementations, in determining the selected number of observation slots, process 400 may involve processor 312 performing one of a number of operations. For instance, process 400 may involve processor 312 randomly selecting the selected number of observation slots, with the selected number being in a range of [0, contention window]. Alternatively, process 400 may involve processor 312 selecting the selected number of observation slots in a round-robin manner. Still alternatively, process 400 may involve processor 312 receiving an assignment of the selected number of observation slots from a supervising device (e.g., UE 130, another UE, or network node 125).

In some implementations, the contention window may be different than (e.g., less than or equal to) a maximum idle period expressed as max(100 µs, 5% of the FFP)/n. In such cases, n may be 9 µs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   performing, by a processor of an apparatus implemented in a frame-based equipment (FBE), clear channel assessment (CCA) of a channel; and
   transmitting, by the processor, during a channel occupancy time (COT) within a fixed frame period (FFP) responsive to the CCA indicating the channel to be clear for transmission,
   wherein the performing of the CCA of the channel comprises:
      prepending the COT with one or more observation slots; and
      sensing the channel using the CCA during the one or more observation slots,
   wherein a duration of the one or more observation slots is less than or equal to an idle period of the FFP, and
   wherein a number of observation slots of the one or more observation slots is selected so that the one or more observation slots align with a predefined number of load-based equipment (LBE) slots.

2. The method of claim 1, wherein the performing of the CCA of the channel comprises performing the CCA of the channel before the COT and within the FFP.

3. The method of claim 1, wherein the performing of the CCA of the channel comprises:
   dividing a pause period in the FFP into a first number of observation slots;
   selecting a second number of the observation slots, the second number being different than the first number; and
   sensing the channel using the CCA after the second number of observation slots and before the COT.

4. The method of claim 3, wherein the second number is in a range of [0, contention window], wherein the contention window is different than a maximum idle period expressed as max(100 µs, 5% of the COT)/n, and wherein n is 9 µs.

5. The method of claim 1, wherein the performing of the CCA of the channel comprises prioritizing access to the channel by:
   dividing a pause period in the FFP into a plurality of observation slots;
   selecting one or more observation slots from the plurality of observation slots by:
      selecting from a random subset of the plurality of observation slots; or
      selecting multiple observation slots from the plurality of observation slots in which transmission is likely; and
   sensing the channel using the CCA during the selected one or more observation slots.

6. The method of claim 1, wherein a duration of the CCA does not exceed an idle period of the FFP.

7. The method of claim 6, wherein the idle period of the FFP is either a predefined period of time or a predefined percentage of the COT.

8. The method of claim 7, wherein the predefined period of time is 100 µs, and wherein the predefined percentage of the COT is 5%.

9. A method, comprising:
   determining, by a processor of an apparatus implemented in a frame-based equipment (FBE), a selected number of observation slots for clear channel assessment (CCA) before a channel occupancy time (COT) within a fixed frame period (FFP) to cause floating of the COT in the FFP with positions of both the observation slots and the COT changed within the FFP;
   performing, by the processor, the CCA of the channel during the determined number of observation slots; and
   transmitting, by the processor, during the COT responsive to the CCA indicating the channel to be clear for transmission.

10. The method of claim 9, wherein the determining of the selected number of observation slots comprises performing:
    randomly selecting the selected number of observation slots, with the selected number being in a range of [0, contention window];
    selecting the selected number of observation slots in a round-robin manner; or
    receiving an assignment of the selected number of observation slots from a supervising device.

11. The method of claim 10, wherein the contention window is different than a maximum idle period expressed as max(100 µs, 5% of the COT)/n, and wherein n is 9 µs.

12. An apparatus implemented in a frame-based equipment (FBE), comprising:
    a transceiver configured to communicate with at least a network node; and
    a processor coupled to the transceiver and configured to perform operations comprising:

performing, via the transceiver, clear channel assessment (CCA) of a channel; and transmitting, via the transceiver, during a channel occupancy time (COT) within a fixed frame period (FFP) responsive to the CCA indicating the channel to be clear for transmission, wherein, in performing the CCA of the channel, the processor performs operations comprising:

prepending the COT with one or more observation slots; and sensing the channel using the CCA during the one or more observation slots, wherein a duration of the one or more observation slots is less than or equal to an idle period of the FFP, and wherein a number of observation slots of the one or more observation slots is selected so that the one or more observation slots align with a predefined number of load-based equipment (LBE) slots.

13. The apparatus of claim 12, wherein, in performing the CCA of the channel, the processor performs the CCA of the channel before the COT and within the FFP.

14. The apparatus of claim 12, wherein, in performing the CCA of the channel, the processor performs operations comprising:

dividing a pause period in the FFP into a first number of observation slots;

selecting a second number of the observation slots, the second number being different than the first number; and sensing the channel using the CCA after the second number of observation slots and before the COT, wherein the second number is in a range of [0, contention window], wherein the contention window is different than a maximum idle period expressed as max(100 μs, 5% of the COT)/n, and wherein n is 9 μs.

15. The apparatus of claim 12, wherein, in performing the CCA of the channel, the processor prioritizes access to the channel by:

dividing a pause period in the FFP into a plurality of observation slots;

selecting one or more observation slots from the plurality of observation slots by:

selecting from a random subset of the plurality of observation slots; or selecting multiple observation slots from the plurality of observation slots in which transmission is likely; and sensing the channel using the CCA during the selected one or more observation slots.

16. The apparatus of claim 12, wherein a duration of the CCA does not exceed an idle period of the FFP, wherein the idle period of the FFP is either a predefined period of time or a predefined percentage of the COT, and wherein the predefined period of time is 100 μs, and wherein the predefined percentage of the COT is 5%.

* * * * *